(12) United States Patent
Li

(10) Patent No.: US 11,143,916 B2
(45) Date of Patent: Oct. 12, 2021

(54) DISPLAY DEVICE

(71) Applicants: HKC Corporation Limited, Shenzen (CN); Chongqing HKC Optoelectronics Technology Co., LTD., Chongqing (CN)

(72) Inventor: Zeyao Li, Chongqing (CN)

(73) Assignees: HKC CORPORATION LIMITED, Shenzen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/759,322

(22) PCT Filed: Dec. 20, 2017

(86) PCT No.: PCT/CN2017/117308
§ 371 (c)(1),
(2) Date: Apr. 24, 2020

(87) PCT Pub. No.: WO2019/080326
PCT Pub. Date: May 2, 2019

(65) Prior Publication Data
US 2020/0310196 A1 Oct. 1, 2020

(30) Foreign Application Priority Data
Oct. 25, 2017 (CN) .......................... 201711009017.3

(51) Int. Cl.
*G02F 1/13357* (2006.01)
*G02F 1/1335* (2006.01)

(52) U.S. Cl.
CPC .. *G02F 1/133608* (2013.01); *G02F 1/133612* (2021.01); *G02F 2201/121* (2013.01)

(58) Field of Classification Search
CPC .............. G02F 2001/133317; G02F 1/133317
See application file for complete search history.

(56) References Cited

U.S. PATENT DOCUMENTS

2005/0062687 A1* 3/2005 Muramatsu ........... G02F 1/1345
345/55
2016/0085110 A1* 3/2016 Shin .................. G02F 1/133308
349/58
(Continued)

FOREIGN PATENT DOCUMENTS

CN 202794775 U 3/2013
CN 104297961 A 1/2015
(Continued)

OTHER PUBLICATIONS

International Search Report issued for the corresponding international application No. PCT/CN2017/117308, dated Jul. 12, 2018, 4 pages (English Translation).

*Primary Examiner* — Jong-Suk (James) Lee
*Assistant Examiner* — Eric T Eide
(74) *Attorney, Agent, or Firm* — Snyder, Clark, Lesch & Chung, LLP

(57) ABSTRACT

The present disclosure illustrates a display device comprising: a backlight module comprising a backlight source; a display panel disposed opposite to the backlight source, and comprising an effective display area, a fan-out area and a common electrode routing area located between the effective display area and the fan-out area; and a light leakage prevention component configured to block the fan-out area to prevent light generated by the backlight source from leaking from the display panel.

20 Claims, 4 Drawing Sheets

(56) References Cited

U.S. PATENT DOCUMENTS

| | | | |
|---|---|---|---|
| 2016/0363801 A1* | 12/2016 | Jung | G02B 6/0086 |
| 2017/0299913 A1* | 10/2017 | Choi | G02B 6/0088 |
| 2018/0307083 A1* | 10/2018 | Wang | G02B 6/0091 |
| 2019/0113675 A1* | 4/2019 | Sugimoto | G02F 1/133308 |
| 2019/0302924 A1* | 10/2019 | Kim | G06F 3/041 |

FOREIGN PATENT DOCUMENTS

| | | |
|---|---|---|
| CN | 204679739 U | 9/2015 |
| CN | 207396921 U | 5/2018 |
| JP | 2008083163 A | 4/2008 |

\* cited by examiner

DISPLAY DEVICE

CROSS-REFERENCE TO RELATED APPLICATION

This application is a National Stage Application of PCT International Patent Application No. PCT/CN2017/117308 filed on Dec. 20, 2017, under 35 U.S.C. § 371, which claims priority to and the benefit of Chinese Patent Application No. 201711009017.3, filed on Oct. 25, 2017, and the disclosures of which are incorporated herein in their entirety by reference.

BACKGROUND

1. Field

The present disclosure relates to a display technology field, more particularly to a display device.

2. Description of the Related Art

With continuous development of technology and economic, electronic products with display panels, such as smart phone, tablet computer, LCD television, personal digital assistant, digital still camera, computer monitor or notebook computer are greatly popular. These electronic products are also required to have display panels with higher quality and performance. The capability of manufacturing the display panel with high image quality, low power, non-radiation, and display stability and performance reliability is an essential competitiveness in the liquid crystal display market.

Almost of all sizes of the LCD backlight modules have dark-state light leakage problem because of the material (such as liquid crystal or PI liquid), manufacturing process (such as direction or angle of plate friction, and the structure of the display devices, and the dark-state light leakage problem also affects the quality of the display screen. For example, an occupation ratio of metal of the fan-out area of the LCD is not hundred percent, so a significant amount of light is leaked from the intervals between metal lines of the fan-out area; furthermore, a certain quantity of liquid crystals are disposed in the fan-out area, and the array substrate of the fan-out area has complex structure to make the liquid crystal in the fan-out area to orientate orderlessly, so that when light passes through the fan-out area, polarization direction of light is deflected with different degree. When the fan-out area with light leakage does not have black matrix, the light leakage phenomenon occurs; even if such fan-out area has the black matrix, when the density of the black matrix is not high enough, the fan-out area also occur the light leakage phenomenon in certain degree, and this phenomenon is called light leakage in fan-out area. In prior art, by changing material and improving the manufacturing process, the light leakage phenomenon occurred by material and the manufacturing process may be reduced, but the light leakage phenomenon occurred by the structure of the display device is hard to be reduced. Furthermore, using higher density of the black matrix may increase the production cost greatly.

Therefore, how to improve the internal routing structure of the open cell of the LCD (that is, the LCD panel attached with the polarizing plate, the driver circuit, the flexible circuit board, and the printed circuit board already) to solve the problem of light leakage in the fan-out area, is a very important issue.

SUMMARY

The present disclosure provides a display device which is provided with a light leakage prevention component according to the internal routing structure of the LCD panel of the LCD, and a backlight source of display device disposed opposite to the display panel, and the backlight source and the fan-out area are staggered in position, so as to solve the problem of light leakage in the fan-out area.

According to an embodiment, the present disclosure provides a display device. The display device comprises: a backlight module including a backlight source; a display panel disposed opposite to the backlight source, and including an effective display area, a fan-out area and a common electrode routing area located between the effective display area and the fan-out area; and a light leakage prevention component configured to block the fan-out area to prevent light generated by the backlight source from leaking from the display panel.

According to an embodiment, the present disclosure provides a display device. The display device comprises: a display panel including an effective display area, a fan-out area and a common electrode routing area located between the effective display area and the fan-out area; a backlight module including a backlight source disposed opposite to the display panel and staggered the fan-out area in position; and a rear shell member configured to fasten and support the backlight source, and a side wall of the rear shell member is extended towards the backlight source and a part of the side wall of the rear shell member is located under the entire the fan-out area.

According an embodiment, the present disclosure further provides a display device. The display device comprises: a backlight module including a backlight source; a display panel disposed opposite to the backlight source and including an effective display area, a fan-out area and a common electrode routing area located between the effective display area and the fan-out area; a light leakage prevention component configured to block the fan-out area to prevent light generated by the backlight source from leaking from the display panel. The light leakage prevention component further comprises: a first frame body disposed between the backlight source and the display panel to support the display panel; and a second frame body disposed on the first frame body to enclose the edge of the display panel. The second frame body and the first frame body are configured to fasten the display panel together, the second frame body covers and blocks entire first surface of the fan-out area, to prevent light of the backlight source from leaking from the display panel. The first surface faces opposite to the backlight source. The first frame body comprises a protrusion part, the second frame body comprises a recessed part, and the protrusion part corresponds in position to the recessed part and can be inserted into the recessed part for connection and fixation.

According to the internal routing structure of open cell of LCD, the light leakage prevention component is disposed in the display device; the position of the first frame body or the second frame body is designed to fully cover and block the fan-out area to prevent light generated by the backlight source from leaking from the display panel. The present disclosure further provides other display device having a backlight source disposed opposite to the display panel, and the backlight source and the fan-out area are staggered in position. As a result, the problem of light leakage in the fan-out area can be solved completely.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
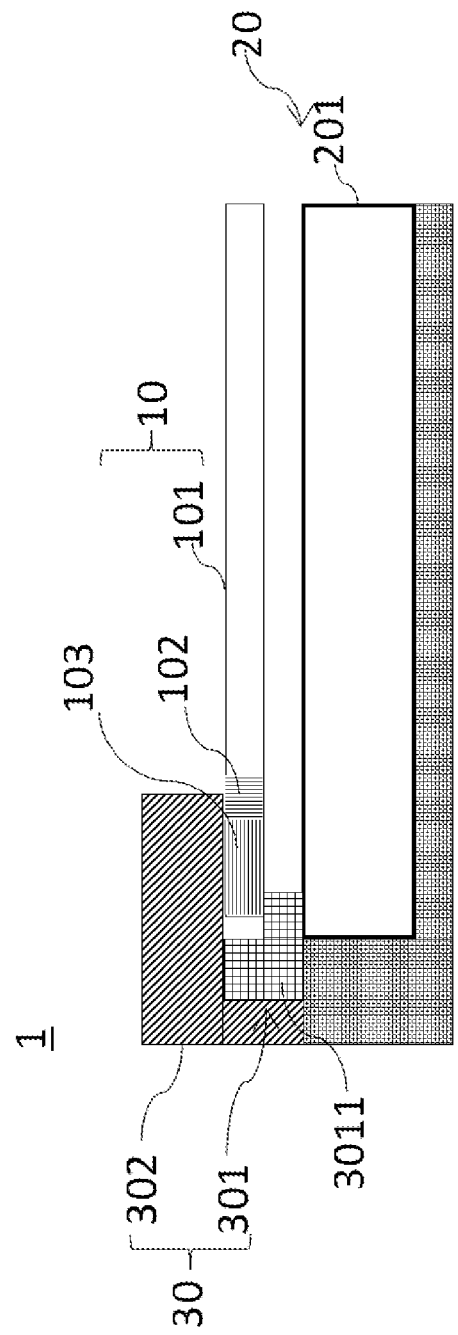
FIG. 1 is a schematic view of a display device of a first embodiment of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

In particular implementation, the display panel can be implemented by various designs. For example, the display panel described in the embodiment of the present disclosure can be, but not limited to, thin-film transistor, LCD panel, organic light-emitting diode display panel, LCD panel, Plasmon display panel, or cathode ray tube display panel.

Please refer to FIG. 1, which is a schematic view of a display device of a first embodiment of the present disclosure. In this embodiment, the display device 1 includes a LCD panel 10, a backlight module 20 and a light leakage prevention component 30.

The display panel 10 comprises an effective display area 101, a fan-out area 103 and a common electrode routing area 102 located between the effective display area 101 and the fan-out area 103. The effective display area 101 is configured to display text or image. The common electrode routing area 102 is a common electrode routing area located between the effective display area 101 and the fan-out area 103, and the common electrode line can reduce resistance, and generally the common electrode line is thicker, so that the common electrode routing area 102 has a very high metal occupation ratio. The backlight module 20 comprises a backlight source 201, the light generated by the backlight source 201 radiated on the common electrode routing area are almost locked by metal, so the light leakage problem does not occur in the common electrode routing area. The fan-out area 103 is configured to electrically connect circuits in the effective display area with the driver circuit in the non-display area. There are metal lines in the fan-out area 103, and the metal occupation ratio of the fan-out area 103 is higher; however, the light generated by the backlight source 201 may pass through the intervals between the metal lines of the fan-out area 103 to cause the dark-state light leakage problem in the display panel. Furthermore, a certain quantity of liquid crystal is disposed in the fan-out area 103, and the array substrate of the fan-out area 103 has complex terrain, so it causes the orderless orientation of the liquid crystal, and when the light generated by the backlight source 201 passes through the fan-out area 103, the polarization direction of the light is deflected with different degree; in this situation, when there is no black matrix disposed in the fan-out area, the light leakage phenomenon must occur; even if there is the black matrix disposed in the fan-out area 103, when the optical density of the black matrix is not enough, the light leakage problem with different degree still occurs. In order to solve the light leakage problem in the fan-out area 103 completely, in this embodiment, the display device 1 of the present disclosure is provided with the light leakage prevention component 30 configured to block the fan-out area 103 to prevent light generated by the backlight source 201 from leaking from the display panel.

The light leakage prevention component 30 comprises a first frame body 301 and a second frame body 302. The first frame body 301 is disposed between the backlight source 201 and the display panel 10 to support the display panel 10, and a size of the backlight source 201 matches a size of the display panel 10. In this embodiment, the first frame body 301 and the second frame body 302 are plastic frame bodies; in other embodiments, the second frame body 302 can be a metal frame body. The first frame body 301 comprises a support pillar 3011 extended perpendicular to the first surface of the fan-out area 103, the support pillar 3011 configured to support the second frame body 302. In some embodiments, the support pillar 3011 is a cylinder, and preferably, a diameter of the cylinder is in a range of 0.7 millimeter to 1 millimeter, so that support pillar 3011 can stably support the second frame body 302. In other embodiments, the support pillar 3011 can be a square cylinder or a cylinder in other shape. The second frame body 302 is disposed on (or over) the first frame body 301 and enclose an edge of the display panel 10, and the second frame body 302 and the first frame body 301 are used to fix the display panel 10 together, the second frame body 302 fully covers and blocks the first surface of the entire fan-out area 103, so as to prevent light of the backlight source 201 from leaking from the fan-out area 103. The first surface faces opposite to the backlight source 201. In some embodiments, the first frame body 301 and the second frame body 302 can be fixed and connected together by using connection corner, or by an engagement manner, or an adhesion manner; however, the present disclosure is not limited thereto.

In above embodiments, the light leakage prevention component 30 can be disposed in the display device and the second frame body 302 of the light leakage prevention component 30 is designed to fully cover and block the first surface of the entire fan-out area 103, and the first surface faces opposite to the backlight source 201, so as to effectively prevent light of the backlight source 201 from leaking from the display panel 10 without increasing the optical density of the black matrix in the fan-out area 103, thereby solving the light leakage problem of the fan-out area 103 completely and ensuring the display quality of the display panel.

Figure 2:
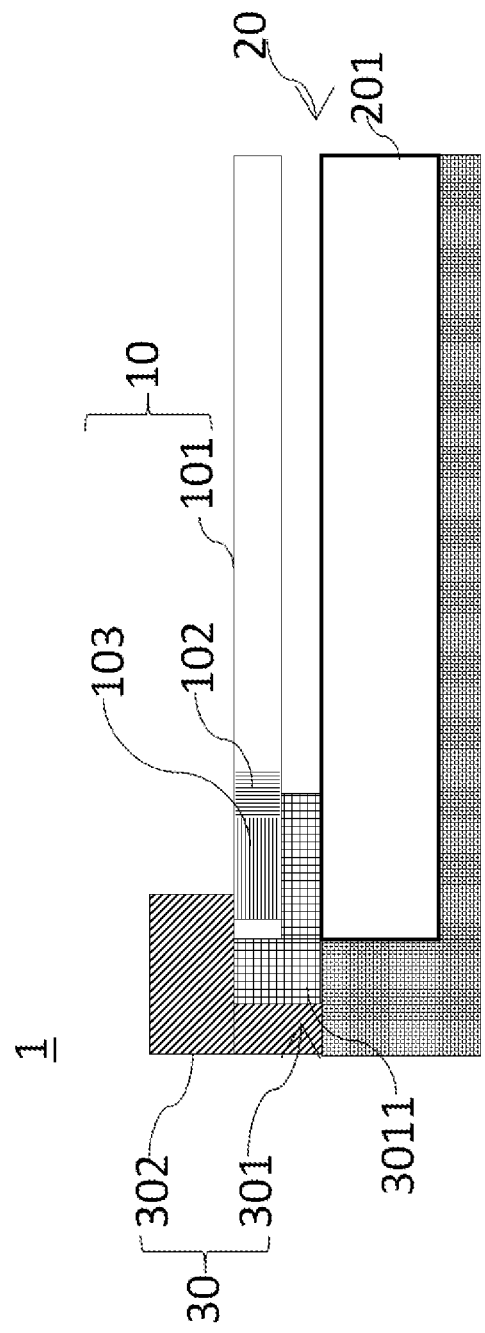
FIG. 2 is a schematic view of a display device of a second embodiment of the present disclosure.

Please refer to FIG. 2, which is a schematic view of a display device of a second embodiment of the present disclosure. Particularly, in this embodiment, the display device 1 includes a LCD panel 10, a backlight module 20 and a light leakage prevention component 30.

The difference between the second embodiment and above embodiment is that the light leakage prevention component 30 comprises the first frame body 301 and the second frame body 302, and the first frame body 301 is disposed between the backlight source 201 and the display panel 10 to cover and block the second surface of entire fan-out area 103, so as to prevent the light generated by the backlight source 201 from leaking from the display panel 10. The second surface faces the backlight source 201. The second frame body 302 is disposed on (or over) the first frame body 301 and encloses the edge of the display panel 10, and the second frame body 302 and the first frame body 301 are used to fix the display panel 10 together. Preferably, a size of the backlight source 201 matches a size of the display panel 10.

The first frame body 301 comprises the support pillar 3011 extended perpendicular to the second surface of the fan-out area 103, and configured to support the second frame body 302. In some embodiments, the support pillar 3011 is a cylinder, and preferably, a diameter of the cylinder is in a range of 0.7 millimeter to 1 millimeter, so that the support pillar 3011 can stably support the second frame body 302. In other embodiments, the support pillar 3011 can be a square cylinder or a cylinder in other shape.

In above embodiments, without increasing the optical density of the black matrix in the fan-out area 103, the light leakage prevention component 30 can be disposed in the display device, and the first frame body 301 of the light leakage prevention component 30 is designed to fully cover and block the second surface of entire fan-out area 103 facing the backlight source 201, so as to effectively prevent light of the backlight source 201 from leaking from the fan-out area 103, thereby solving the light leakage problem of the fan-out area 103 completely and ensuring the display quality of the display panel.

Figure 3:
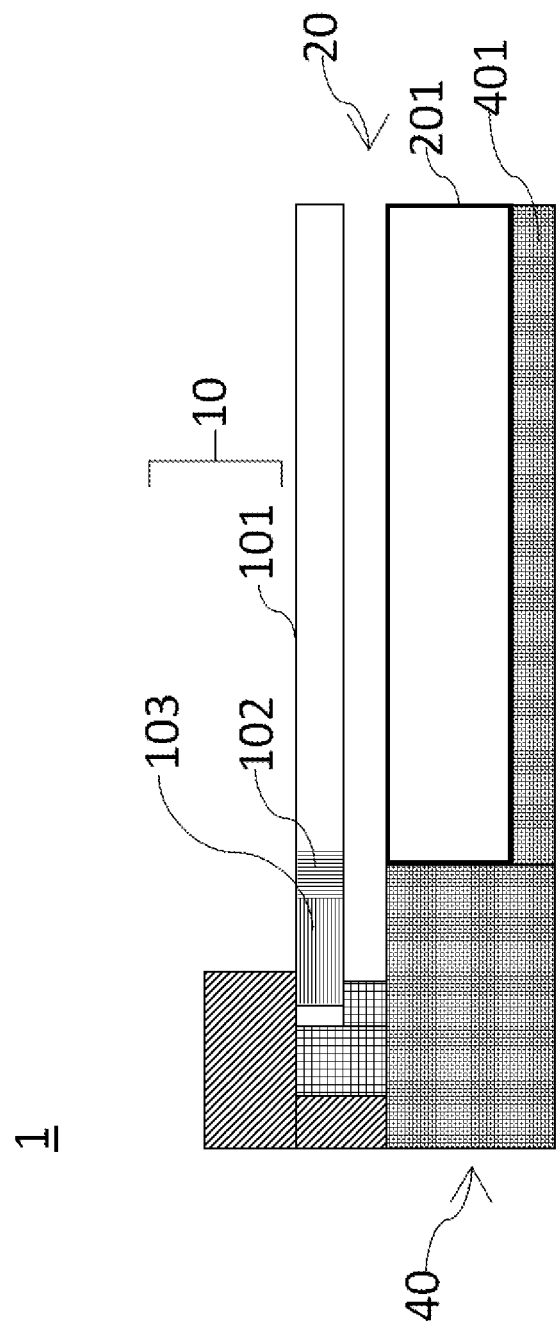
FIG. 3 is a schematic view of a display device of a third embodiment of the present disclosure.

Please refer to FIG. 3, which is a schematic view of a display device of a third embodiment of the present disclosure. Particularly, in this embodiment, the display device 1 includes a LCD panel 10, a backlight module 20 and a rear shell member 40.

The display panel 10 comprises an effective display area 101, a fan-out area 103 and a common electrode routing area 102 located between the effective display area 101 and the fan-out area 103. The effective display area 101 is configured to display text or image. The common electrode routing area 102 is a common electrode routing area located between the effective display area 101 and the fan-out area 103, and the common electrode line can reduce resistance; generally, the common electrode line is thicker, so that the common electrode routing area 102 usually has a very high metal occupation ratio. The backlight module 20 comprises the backlight source 201, and the light generated by the backlight source 201 radiated on the common electrode routing area are almost locked by metal, so the light leakage problem does not occur in the common electrode routing area. The fan-out area 103 is configured to electrically connect circuits in the effective display area with the driver circuit in the non-display area.

The backlight source 201 is disposed opposite to the display panel 10 and the he backlight source 201 and the fan-out area 103 are staggered in position, so as to prevent light generated by the backlight source 201 from leaking from the fan-out area 103, thereby completely solving the light leakage problem in the fan-out area. Preferably, the size of the backlight source 201 matches the size of the effective display area 101. The display device 1 comprises the rear shell member 40 configured to fix and support the backlight source 201. The side wall of the rear shell member 40 is extended towards the backlight source 201 and a part of the side wall of the rear shell member 40 is located under the entire the fan-out area 103. The rear shell member 40 comprises the support 401 extended perpendicular to the side wall of the rear shell member 40 towards the lower surface of the backlight source 201, and configured to stably support the backlight source 201.

In above embodiments, without increasing the optical density of the black matrix in the fan-out area 103, the position of the backlight source 201 in the display device can be redesigned, and the backlight source 201 is disposed opposite to the display panel 10, and the backlight source 201 and the fan-out area are staggered in position, so as to effectively prevent light of the backlight source 201 from leaking from the fan-out area 103, thereby solving the light leakage problem of the fan-out area 103 completely and ensuring the display quality of the display panel.

Figure 4:
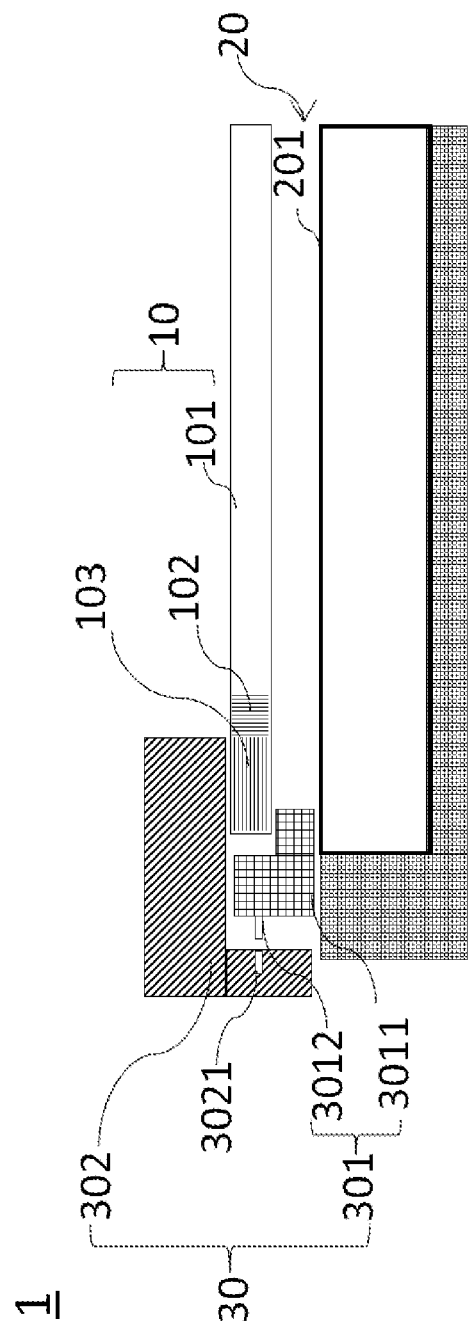
FIG. 4 is a schematic view of other display device of the present disclosure.

Please refer to FIG. 4. The present disclosure further provides a display device 1. The display device 1 includes a LCD panel 10, a backlight module 20 and a light leakage prevention component 30.

The display panel 10 comprises the effective display area 101, the fan-out area 103 and the common electrode routing area 102 located between the effective display area 101 and the fan-out area 103. The effective display area 101 is configured to display text or image. The common electrode routing area 102 is a common electrode routing area located between the effective display area 101 and the fan-out area 103, and the common electrode line can reduce resistance; generally, the common electrode line is thicker, so that the common electrode routing area 102 has a very high metal occupation ratio. The backlight module 20 comprises the backlight source 201, and light generated by the backlight source 201 radiated on the common electrode routing area are almost locked by metal, so that the light leakage problem does not occur in the common electrode routing area. The fan-out area 103 is configured to electrically connect circuits in the effective display area with the driver circuit in the non-display area. There are metal lines in the fan-out area 103, so the metal occupation ratio is higher, however, the light generated by the backlight source 201 may pass through the intervals between the metal lines of the fan-out area 103 to cause the dark-state light leakage problem in the display panel, and a certain quantity of liquid crystal is disposed in the fan-out area 103, and the array substrate of the fan-out area 103 has complex terrain to cause the orderless orientation of the liquid crystal, so when the light generated by the backlight source 201 passes through the fan-out area 103, the polarization direction of the light is deflected with different degree; in this situation, when there is no black matrix disposed in the fan-out area 103, the light leakage phenomenon must occur; even if there is the black matrix disposed in the fan-out area 103, when the optical density of the black matrix is not high enough, the light leakage problem with different degree still occurs. In order to solve the light leakage problem in the fan-out area 103 completely, in this embodiment, the display device 1 is provided with the light leakage prevention component 30 configured to block the fan-out area 103 to prevent light generated by the backlight source 201 from leaking from the display panel.

The light leakage prevention component 30 comprises the first frame body 301 and the second frame body 302. The first frame body 301 is disposed between the backlight source 201 and the display panel 10 to support the display panel 10, and the size of the backlight source 201 matches a size of the display panel 10 preferably. In this embodiment, the first frame body 301 and the second frame body 302 are plastic frame bodies; however, in other embodiments, the second frame body 302 can be a metal frame body. The first frame body 301 comprises a support pillar 3011 extended perpendicular to the first surface of the fan-out area 103 and configured to support the second frame body 302. In some embodiments, the support pillar 3011 is a cylinder, and preferably, a diameter of the cylinder is in a range of 0.7 millimeter to 1 millimeter, so that the support pillar 3011 can stably support the second frame body 302. In other embodiments, the support pillar 3011 can be a square cylinder or a cylinder in other shape. The second frame body 302 is disposed on (or over) the first frame body 301 and enclose the edge of the display panel 10, and the second frame body 302 and the first frame body 301 are used to fix the display panel 10 together. The second frame body 302 fully covers and blocks the first surface of the entire the fan-out area 103 facing opposite to the backlight source 201, so as to prevent light of the backlight source 201 from leaking from the fan-out area 103. In this embodiment, the first frame body includes the protrusion part 3012 extended from the support pillar 3011 leftwardly and facing away from the side wall of the first surface of the fan-out area 103, and the second frame body includes the recessed part 3021 formed at a part thereof and configured to cover the edge of the display panel 10. The protrusion part 3012 corresponds in position to the recessed part 3021 and can be inserted into the recessed part 3021 for connection and fixation.

In above embodiments, without increasing the optical density of the black matrix in the fan-out area 103, the light leakage prevention component 30 can be disposed in the display device, the second frame body 302 of the light leakage prevention component 30 is designed to fully cover and block the first surface of the entire the fan-out area 103 facing opposite to the backlight source 201, so as to effectively prevent light of the backlight source 201 from leaking from the display panel 10, thereby solving the light leakage problem of the fan-out area 103 completely, ensuring the display quality of the display panel.

It is to be noted that the devices disclosed in the embodiments of the present disclosure can be implemented by other manners, and the embodiment of the device are merely for exemplary illustration; for example, the classification for the components is just based on structure functions of the components, and these components can be classified by other manner; for example, the components can be combined or integrated with other device, or some features can be omitted, or. Furthermore, the coupling, direct coupling or communication between the components can be performed through indirect coupling or communication of interfaces, devices or modules.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A display device, comprising:
   a backlight module comprising a backlight source;
   a display panel disposed opposite to the backlight source, and comprising an effective display area, a fan-out area and a common electrode routing area located between the effective display area and the fan-out area; and
   a light leakage prevention component configured to block the fan-out area to prevent light generated by the backlight source from leaking from the display panel;
   wherein the light leakage prevention component exposes both surfaces of the display panel where the common electrode routing area is located.

2. The display device according to claim 1, wherein the light leakage prevention component comprises:
   a first frame body disposed between the backlight source and the display panel to support the display panel; and
   a second frame body disposed on the first frame body to enclose an edge of the display panel, wherein the second frame body and the first frame body are configured to fasten the display panel together, and the second frame body covers and blocks entire first surface of the fan-out area, to prevent the light of the backlight source from leaking from the display panel, and the first surface faces opposite to the backlight source.

3. The display device according to claim 2, wherein the first frame body comprises a support pillar extended perpendicular to the first surface of the fan-out area and configured to support the second frame body.

4. The display device according to claim 3, wherein the support pillar is a cylinder.

5. The display device according to claim 4, wherein a diameter of the cylinder is in a range of 0.7 millimeter to 1 millimeter.

6. The display device according to claim 2, wherein a size of the backlight source matches a size of the display panel.

7. The display device according to claim 1, wherein the light leakage prevention component comprises:
   a first frame body disposed between the backlight source and the display panel, and configured to cover and block a second surface of entire fan-out area to prevent light generated by the backlight source from leaking from the display panel, and the second surface faces the backlight source; and
   a second frame body disposed on the first frame body to enclose an edge of the display panel, wherein the second frame body and the first frame body are configured to fasten the display panel together.

8. The display device according to claim 7, wherein the first frame body comprises a support pillar extended perpendicular to the second surface of the fan-out area and configured to support the second frame body.

9. The display device according to claim 8, wherein the support pillar is a cylinder.

10. The display device according to claim 9, wherein a diameter of the cylinder is in a range of 0.7 millimeter to 1 millimeter.

11. The display device according to claim 7, wherein a size of the backlight source matches a size of the display panel.

12. A display device, comprising:
a display panel comprising an effective display area, a fan-out area and a common electrode routing area located between the effective display area and the fan-out area;
a backlight module comprising a backlight source disposed opposite to the display panel, and the backlight module and the fan-out area staggered in position; and
a rear shell member configured to fasten and support the backlight source, wherein a side wall of the rear shell member is extended towards the backlight source and a part of the side wall of the rear shell member is located under the entire fan-out area;
wherein the rear shell member exposes both surfaces of the display panel where the common electrode routing area is located.

13. The display device according to claim 12, wherein a size of the backlight source matches a size of the effective display area.

14. The display device according to claim 12, wherein the rear shell member comprises a support pillar extended along a direction perpendicular to the side wall of the rear shell member towards the lower surface of the backlight source, and configured to support the backlight source.

15. A display device, comprising:
a backlight module comprising a backlight source;
a display panel disposed opposite to the backlight source and comprising an effective display area, a fan-out area and a common electrode routing area located between the effective display area and the fan-out area; and
a light leakage prevention component configured to block the fan-out area to prevent light generated by the backlight source from leaking from the display panel;
wherein the light leakage prevention component comprises:
a first frame body disposed between the backlight source and the display panel and configured to support the display panel; and
a second frame body disposed on the first frame body to enclose an edge of the display panel, wherein the second frame body and the first frame body are configured to fasten the display panel together, the second frame body covers and blocks entire first surface of the fan-out area to prevent light of the backlight source from leaking from the display panel, and the first surface faces opposite to the backlight source, wherein the first frame body comprises a protrusion part, the second frame body comprises a recessed part, and the protrusion part corresponds in position to the recessed part and is configured to be insert into the recessed part for connection and fixation;
wherein the light leakage prevention component exposes both surfaces of the display panel where the common electrode routing area is located.

16. The display device according to claim 15, wherein the first frame body comprises a support pillar extended perpendicular to the first surface of the fan-out area and configured to support the second frame body.

17. The display device according to claim 16, wherein the support pillar is a square cylinder.

18. The display device according to claim 16, wherein the support pillar is a cylinder.

19. The display device according to claim 18, wherein a diameter of the cylinder is in a range of 0.7 millimeter to 1 millimeter.

20. The display device according to claim 15, wherein a size of the backlight source matches a size of the display panel.

* * * * *